United States Patent [19]
Sircom

[11] 3,794,884
[45] Feb. 26, 1974

[54] GROUND FAULT INTERRUPTER WITH PULSED NEUTRAL-TO-GROUND FAULT DETECTOR

[75] Inventor: Richard C. Sircom, Scarborough, Ontario, Canada

[73] Assignee: Federal Pacific Electric Company, Newark, N.J.

[22] Filed: May 29, 1973

[21] Appl. No.: 364,890

Related U.S. Application Data

[63] Continuation-in-part of Ser. No. 320,855, Jan. 4, 1973.

[52] U.S. Cl................ 317/18 D, 317/27 R, 317/53
[51] Int. Cl.................................................... H02h
[58] Field of Search ... 317/18 D, 337, 53, 38, 27 R, 317/52

[56] References Cited
UNITED STATES PATENTS

| | | | |
|---|---|---|---|
| 3,638,072 | 1/1972 | Kobayashi.................... | 317/18 D |
| 3,597,656 | 8/1971 | Douglas......................... | 317/18 D |
| 3,713,003 | 1/1973 | Benham........................ | 317/18 D |

*Primary Examiner*—J. D. Miller
*Assistant Examiner*—Pat Salce

[57] ABSTRACT

Apparatus for monitoring an alternating-current circuit having a differential current transformer to sense line-to-ground faults includes a pulsed ringing circuit for evidencing freedom of the alternating-current circuit from neutral-to-ground faults that could reduce the sensitivity of the line-to-ground fault detector.

7 Claims, 1 Drawing Figure

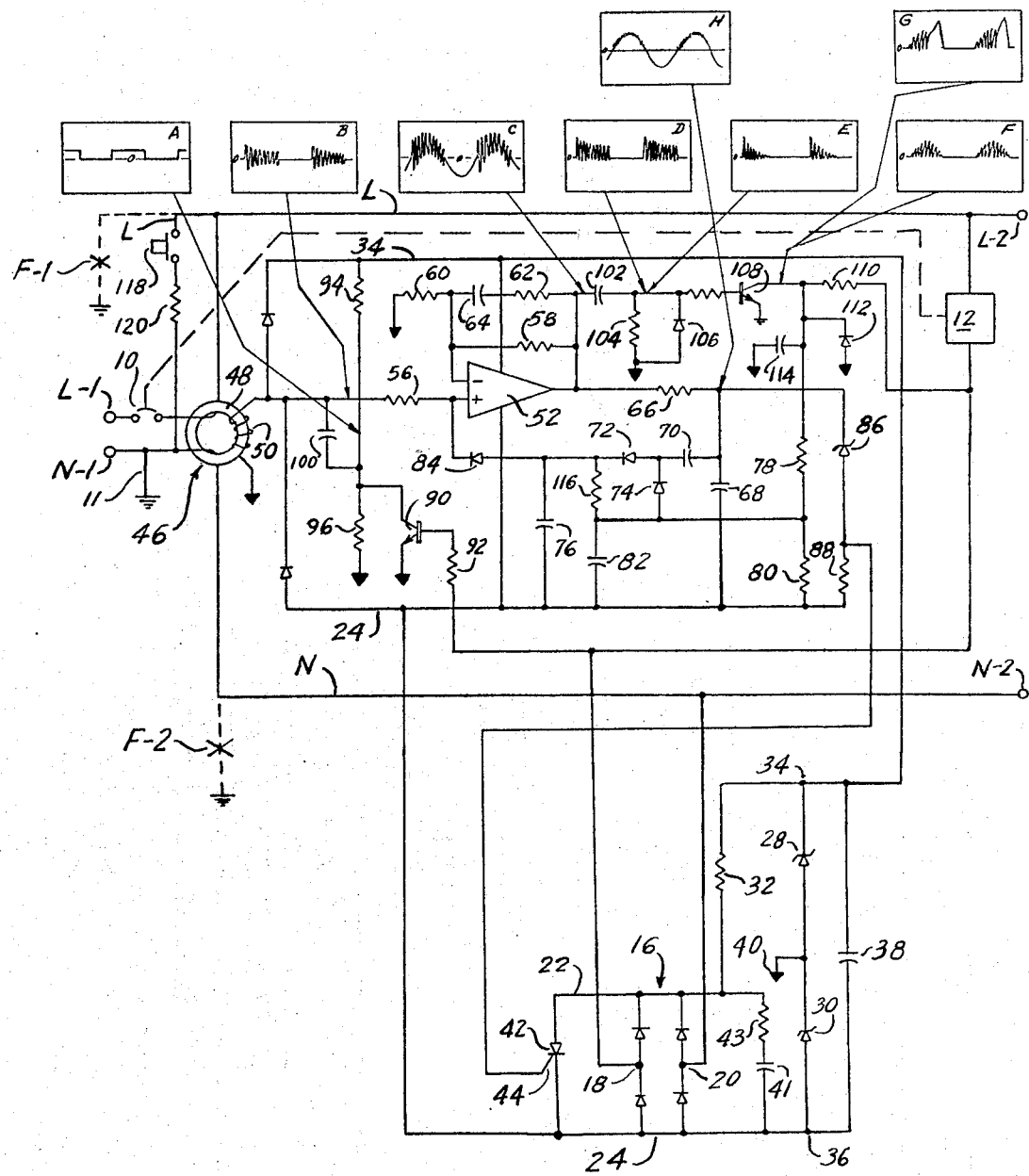

3,794,884

GROUND FAULT INTERRUPTER WITH PULSED NEUTRAL-TO-GROUND FAULT DETECTOR

This application is a continuation-in-part of my application Ser. No. 320,855, filed Jan. 4, 1973, and represents an improvement thereof.

This invention relates to apparatus for monitoring an alternating current circuit for detecting neutral-to-ground faults, and to combined detectors for both line-to-ground faults and neutral-to-ground faults.

BACKGROUND OF THE INVENTION

The above identified application discloses a line-to-ground leakage detector involving a differential current transformer, (commonly called a DCT) together with means for detecting a meutral-to-ground fault of such low impedance as to impair significantly the sensitivity of the line-to-ground fault detector. In principle, the leakage current resulting from a fault between the line conductor and ground in an alternating current circuit should return to the alternating current supply by way of the ground-return path. However, in case of a low-impedance fault from neutral-to-ground, a fraction of the line-to-ground leakage current would return to the a-c source via the neutral. That fraction of the leakage current would not contribute to the unbalance in the DCT, of the line-to-ground fault detector which, accordingly would not respond properly to the full line-to-ground leakage current.

In my pending application, a DCT is excited by an oscillator where the line and neutral conductors serve as primary windings of the DCT. In case of a neutral-to-ground fault of low enough impedance to desensitize the DCT of the line-to-ground fault detector, a ground loop is created that loads the DCT-oscillator circuit. That ground loop consists of the neutral conductor, the ground-return path, the grounding connection of the neutral at the a-c supply and the neutral-to-ground fault. The Q of a winding on the DCT is reduced, reducing the output of the oscillator and causing tripping of a circuit interrupter.

Under an established standard, any value of line-to-ground fault of 24,000 ohms or less on a 120-volt circuit would produce a leakage current of 5 milliamperes or more, regarded as the hazard level of the line-to-ground fault detector. Correspondingly, a ground-loop impedance of four ohms or less is regarded hazardous, unduly reducing the sensitivity of the line-to-ground fault detector. However, it has been found difficult to maintain the amplitude of the oscillator at the desired level, particularly when proper operation is required over a temperature range of 65° C to −35° C as in the above-mentioned standard.

SUMMARY OF THE INVENTION

In the presently preferred embodiment of the invention detailed below, a common DCT is used in both a line-to-ground fault detector and a neutral-to-ground fault detector. A winding on the DCT which ideally but not necessarily serves as the output winding of the DCT is connected to a capacitor, proportioned to resonate at a much higher frequency than that of the alternating-current supply. Periodically the resonant circuit consisting of the output winding and the capacitor is excited by a pulse of nearly-constant amplitude, causing the resonant circuit to ring. Under normal conditions, when there is no neutral-to-ground fault, the ringing decays only a little during a short period after each pulse. In case a ground loop develops due to a neutral-to-ground fault, the ringing is damped during the same period. This effect is utilized in detecting the appearance of a neutral-to-ground fault of such a valve as to desensitize significantly the line-to-ground fault detection means.

In common with my above identified application, the same DCT and the same amplifier are used in both the line-to-ground fault detector and the neutral-to-ground fault detector, leading to important economies. Failure of the pulsing circuit or a break in the DCT output winding have the same effect as the damping that represents a neutral-to-ground fault, imparting a large measure of fail-safe performance.

Coupling of various signal points in the circuit to cut-off biasing potential is included, having the effect of suppressing spurious operation of the circuit when power is first turned on and until the whole circuit reaches stabilized operating conditions.

The nature of the invention and the foregoing and other novel features and advantages will be better appreciated from a review of the following detailed description of a presently preferred embodiment shown in the accompanying drawings.

The single FIGURE of the drawings is a wiring diagram of a line-to-ground fault detector, integrated with a novel neutral-to-ground fault detector, the diagram including rectangles A through H representing signals appearing under various conditions at the indicated parts of the wiring diagram.

In the drawing, line L and neutral N extend from terminals L-1 and N-1 at the supply end of an alternating current branch circuit to terminals L-2 and N-2 at the load end of the alternating current circuit. Typically, the a-c frequency is 60 Hz. In conventional manner, the neutral N has a ground 11 adjacent supply terminal N-1. Line conductor L is seen to include an interrupter having contacts 10 and a trip coil 12. In common practice interrupter 10 12 is a circuit breaker having a shunt-trip coil for causing the contacts to open, additional to any overload release that is included, such as an overcurrent responsive bi-metal and an overcurrent responsive magnetic tripping means.

The circuit illustrated includes a full-wave diode bridge 16 having alternating current supply terminals 18 and 20. Terminal 18 is connected to line conductor L by way of trip coil 12 (rather than directly) as a matter of convenience. The current drawn by the bridge is far lower than anything that would activate the tripping machanism. Terminal 20 is connected to the neutral conductor N. Direct-current output terminals 22 and 24 are connected to a series circuit including zener diodes 28 and 30 and a dropping or regulating resistor 32. Regulated d.c. potential appears between positive line 34 and negative line 36, filtered by capacitor 38. A mean d-c potential point 40 midway between lines 34 and 36 provides what amounts to a d-c ground or common or zero-potential reference bus for the electronic control circuit. A further filter capacitor 41 is connected across the output of the bridge. Resistor 43 in series with the capacitor limits surges of current to the capacitor to avoid acoustic hum, which may be objectionable.

An SCR 42 has its anode-cathode circuit connected between d-c terminals 22 and 24 of the bridge. When the trip coil is to be energized, SCR 42 is fired and thereby causes short-circuiting of the bridge so that an energizing circuit for the trip coil extends from neutral conductor N via terminals 20 and 18 to trip coil 12 and to line conductor L.

A differential current transformer 46 includes a toroidal core 48, advantageously compact and made of ferrite, that is threaded by conductors L and N in such a sense that their respective fluxes due to alternating current supplied to a load at terminals L-2, to N-2 are mutually cancelling and ideally no magnetic flux is developed in the toroidal core. A secondary winding 50 on the toroid develops output in the event that there is any unbalance in the currents carried by the conductors L and N. Operational amplifier 52 amplifies any 60-cycle signal from winding 50 resulting from unbalance of the currents in the conductors L and N. Secondary winding 50 of the differential current transformer is connected by a resistor 56 to the non-inverting input terminal of operational amplifier 52. Operational amplifier 52 also serves as a pulse generator for triggering SCR 42 to operate trip coil 12. The non-inverting input of amplifier 52 extends to the d-c ground through resistor 56 and coil 50, providing an operating-point bias for the amplifier. Resistors 58 and 60 are connected in series between the output of amplifier 52 and the d-c ground, and the junction of resistors 58 and 60 is connected to the inverting input terminal of the amplifier, thus providing a relatively high stabilized closed-loop gain for d-c and low-frequency signals, a gain of 1000 for example. Resistor 62 and capacitor 64 in the negative-feedback path of the amplifier reduces the gain of the amplifier at higher frequencies. In an example, the gain is approximately 30 at 5 KHz.

In the event of a fault F-1 between line L and ground, the current in neutral conductor N is less than that in line conductor L by the amount of the leakage current of fault F-1. The resulting 60 Hz output is amplified by 1,000 (in this example) and fed through a low-pass filter comprising resistor 66 and capacitor 68 in series, to remove high frequency content. The wave-form of this signal is shown in rectangle H. Any d.c. offset in the amplifier output is decoupled by capacitor 70 which drives a signal voltage doubler including diode rectifiers 72 and 74, and capacitor 76. The doubler is referenced from a negative bias point established at the junction of resistors 78 and 80. This junction is by-passed to negative bus 24 by capacitor 82.

In the absence of a fault F-1 between line L and ground, the d-c output of the doubler would be substantially zero and therefore, the cathode of diode 72 will be negative with respect to the d-c ground of the circuit. A diode 84 is connected between the output of voltage doubler 70, 72, 74. The cathode of diode 84 is reverse biased. On the other hand, when a fault F-1 appears that is sufficiently serious to warrant tripping of the circuit interrupter, diode 84 becomes forward-biased, so that a positive d.c. voltage is developed across resistor 56 in series with the low resistance of secondary winding 50. This is amplified by the factor of 1,000 in the present example, driving the output of the amplifier strongly positive. This positive-going output is coupled back to the non-inverting input, since diode 84 is now conducting. This positive feedback insures a "snap" action, driving the amplifier almost to the voltage of the positive bus 34. A zener avalanche diode 86 is connected between resistors 66 at the output of amplifier 52 and resistor 88 which is connected to the negative bus 24. The junction of resistor 88 and diode 86 is connected to the gate 44 of SCR 42. When the amplifier output approaches the voltage of the positive bus 34, the avalanche voltage of diode 86 is exceeded and a triggering voltage reaches gate 44 of the SCR. When this occurs, the d-c output of bridge 16 is short-circuited and consequently an alternating current energizing circuit for trip coil 12 develops from line L through the short-circuited bridge to neutral conductor N. Consequently, when a hazardous fault F-1 develops between line conductor L at the load side of DCT 46, trip coil 12 is energized and causes interrupter contacts 10 to break the circuit from supply terminal L-1 to load conductor L. A hazardous fault F-1 under certain Underwriters' Laboratory standards is 5 milliamperes or more which in a 120-volt circuit, is 24,000 ohms or less.

As indicated above, the sensitivity of DCT 46 to respond to leakage from line L to ground via fault current path F-1 is diminished in case a neutral-to-ground fault F-2 should occur. It is recognized that a closed-loop circuit develops when fault F-2 occurs, including the ground connection 11 adjacent supply terminal N-1, the neutral conductor N, fault F-2, and the ground-return path. That return path may be a grounding or "shield" conductor or "green" wire. The closed-loop circuit may be called a "ground loop." Upon occurrence of a low-impedance neutral-to-ground fault F-2, a fraction of the fault current from line L-1 to ground via fault F-1 which reaches the ground conductor would then return to the neutral conductor by way of fault F-2 and return to supply terminal N-1 through the DCT 46. That represents a loss of sensitivity of the detector to the actual value of the current flowing in fault F-1. The following provision is made for causing the trip coil 12 to open the interrupter 10 in case a fault F-2 develops of sufficient magnitude to reduce unduly the sensitivity of the differential current transformer.

Ringing pulses are impressed on the differential current transformer 46. For this purpose, the output winding 50 is utilized in the ringing circuit, although a separate winding might be made to serve for the same purpose. Transistor 90 with a grounded emitter has its base driven via resistor 92 by a 60 Hz signal supplied from line L via trip coil 12. When this signal is negative, transistor 90 is cut off, and its collector is at a d-c level of a fraction of a volt (for example) as set by resistors 94 and 96. When its base is driven positive, transistor 90 saturates, driving its collector to the potential of the d-c ground. In this way a small negative-going pulse is applied to winding 50 of DCT 46 via capacitor 100. This signal is represented in rectangle A. Winding 50 and capacitor 100 form a resonant circuit which rings at about 5 KHz (for example) during the positive half-cycles of the 60 Hz wave. The ringing circuit includes winding 50, capacitor 100, and transistor 90 in its saturated condition.

Under normal conditions (with no fault F-2 from neutral-to-ground) a substantial ringing amplitude remains at the end of each positive half-cycle. However, as soon as transistor 90 is cut off, the value of resistor 96 effectively in parallel with resistor 94 is introduced in series with capacitor 100. This reduces the "Q" of the resonant circuit to a very low value so that the oscillations cease almost instantly. The resulting wave-form is shown in rectangle B at the top of the drawing.

The signal B is amplified moderately by amplifier 52, for example by a factor of 30, along with any 60 Hz voltage due to line-to-ground leakage in path F-1. For fault signals below the trip level, the combined signals on the amplifier output are as shown in rectangle C. The high-frequency components are separated by high-pass filter including series capacitor 102 and shunt resistor 104. Under normal conditions, the output of this filter is the signal represented in the rectangle D. This signal is fed to the base of transistor 108. Diode 106 matches the base-emitter diode path of transistor 108, providing a discharge path for capacitor 102.

The collector of transistor 108 is supplied with alternating-current voltage through resistor 110, the same source as that which drives pulsing transistor 90. Thus, when the collector of transistor 108 is positive, it is pulsed into saturation at a 5 KHz rate, producing the wave form represented in rectangle F. This is a half sign-wave envelope of sawtooth pulses of low average value, prevented from going negative by rectifier 112. During the 5 KHz pulses, the collector is at d-c ground potential; and between these pulses the time constant of resistor 110 and capacitor 114 (e.g. 1 millisecond) allows only a limited rise of voltage at the collector.

The output voltage of transistor 108 supplies the top of voltage divider 78, 80, the mid-point of which is by-passed by capacitor 82. Under normal conditions, with pulse-trains D impressed on its base, transistor 108 is driven into saturation at the ringing pulse frequency for the full duration of the positive half-cycle of its collector supply. These high frequency pulses are by-passed to d-c ground by capacitor 82. Consequently, there is virtually no output from the voltage doubler 70, 72, 74, as previously described.

In case a neutral-to-ground fault F-2 should develop of such low impedance as to significantly reduce the sensitivity of DCT 46 to a fault F-1, then a low-impedance loop has come into being. This ground loop involves neutral conductor N, neutral-to-ground fault F-2, the ground-return path and the ground connection 11 to neutral terminal N-1. This loop causes damping of the resonance that normally develops in the capacitor 100 and winding 50, or stated in other terms, lowers the Q of the resonant circuit. The ringing pulse is damped, and appears as represented in rectangle E at the output of filter 102, 104. Consequently, transistor 108 will no longer be saturated for the full duration of the positive half-cycle of its collector supply. This will allow the collector voltage to go strongly positive toward the end of the pulse as shown in the curve of rectangle G. This raises the mid-point of voltage divider 78, 80 correspondingly, driving the non-inverting input of amplifier 52 positive through resistor 116 and diode 84. This causes "snap" action triggering of SCR 42, as described above.

Capacitors 68, 76 and 82 are returned to the negative bus 24, rather than to the d-c ground. At the time that the entire circuit is first energized, the negative bus 24 goes rapidly negative, and the opposite electrodes of these capacitors follow the bus momentarily. This prevents false triggering during the few milliseconds required for the amplifier to settle and establish normal operation.

Button 118 applies the usual test current to DCT 46 from line L to a-c ground, for demonstrating the responsiveness of the circuit to a fault F-1. During this test and at any other time, if certain parts of the system should fail (such as connections to winding 50 or a break in that winding) then transistor 108 will not be saturated for any part of the positive half-cycle of the collector supply, and trip coil 12 would be energized to open interrupter 10.

It is evident that differential current transformer 46 can be used with the 5 KHz pulsing and pulse-responsive system apart from the parts of the circuit forming a system for detection of line-to-ground faults. Such a detector for faults F-2 could be used with a separate detector (with its own DCT) for detecting faults F-1. It is also apparent that additional line conductors L can be included, with or without modifications of the illustrated circuit.

The illustrated circuit is operative and stable over a wide frequency range. It is economical since it uses many parts of the circuit for separately testing for the two different faults F-1 and F-2 which are of such widely different values. Moreover, partly because many circuit components are used in common in both fault detection functions and partly because the failure of many of the circuit components and connections would result in automatic activation of the circuit interrupter, a high order of fail-safe operation is realized.

While the foregoing illustrative embodiment of the invention is exemplary, it will be recognized that varied rearrangements and modifications as well as various applications of its novel features will be made readily by those skilled in the art. Accordingly, the invention should be construed broadly in accordance with its full spirit and scope.

I claim:

1. Apparatus for monitoring an alternating current supply circuit having at least one line conductor, a neutral conductor, and means forming a ground-return, wherein said conductors extend from supply terminals to load terminals and wherein the neutral conductor has a ground connection to the ground-return, the monitoring apparatus including neutral-to-ground fault monitoring means having a differential current transformer having a core and primary windings forming series segments of said line and neutral conductors so arranged that load current carried thereby tends to produce mutually cancelling flux in said core, the differential current transformer being disposed between said ground connection and said load terminals, resonant means resonant at a higher frequency than that of the alternating current supply circuit including a further winding linking said core and a capacitor connected to said further winding, means for periodically pulsing said resonant means, and fault-evidencing means coupled to said transformer for responding thereto in one manner to indicate normal operation when the resonant means rings at least at a minimum amplitude for a prescribed period after each pulse of the pulsing means and for responding thereto differently to indicate abnormal operation in the event of a fault between the neutral conductor and the ground-return means at the load-terminal side of said transformer causing damping of the resonant means and decay of the ringing below said minimum amplitude during said period.

2. Monitoring apparatus in accordance with claim, 1, wwherein said neutral-to-ground fault evidencing means and said resonant means include said further winding in common.

3. Monitoring apparatus in accordance with claim 1, wherein said pulsing means is coupled to the alternating current supply circuit to be synchronized therewith.

4. Monitoring apparatus in accordance with claim 1, wherein said fault-evidencing means includes a transistor pulsed into saturation at the ringing frequency so long as the minimum ringing amplitude is sustained.

5. Monitoring apparatus in accordance with claim 4, further including time-constant circuit means restraining response to the transistor for intervals only slightly longer than the period of the ringing frequency.

6. Monitoring apparatus in accordance with claim 1, further including means coupled to the differential current transformer for evidencing the appearance of a line-to-ground fault which causes flux unbalance in said core at the frequency of the alternating current circuit.

7. Monitoring apparatus in accordance with claim 6, wherein said neutral-to-ground fault evidencing means and said line-to-ground fault evidencing means and said resonant means include said further winding in common.

* * * * *